(12) United States Patent
Pont et al.

(10) Patent No.: US 6,438,937 B1
(45) Date of Patent: Aug. 27, 2002

(54) SYSTEM AND METHOD FOR MODULAR CONTROL OF A MULTI-FUEL LOW EMISSIONS TURBOGENERATOR

(75) Inventors: Guillermo Pont, Los Angeles; James Brian Dickey; Ed Edelman, both of Agoura Hills; Mark G. Gilbreth, Woodland Hills, all of CA (US); Jeffrey W. Willis, Lexington, KY (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/972,672

(22) Filed: Oct. 5, 2001

Related U.S. Application Data (63) Continuation of application No. 09/453,825, filed on Dec. 1, 1999.

(51) Int. Cl.[7] .................................................. F02G 7/26
(52) U.S. Cl. .................... 60/39.06; 60/39.03; 60/39.27; 60/39.281; 60/29
(58) Field of Search ............................ 60/39.03, 39.27, 60/39.281, 39.29, 39.06

(56) References Cited

U.S. PATENT DOCUMENTS

| | | | |
|---|---|---|---|
| 5,327,718 A | * | 7/1994 | Iwata et al. ............... 60/39.03 |
| 5,806,299 A | * | 9/1998 | Bauermeister et al. ..... 60/39.06 |
| 5,896,736 A | * | 4/1999 | Rajamani ................... 60/39.03 |

\* cited by examiner

Primary Examiner—Charles G. Freay
Assistant Examiner—William Rodriquez
(74) Attorney, Agent, or Firm—Irell & Manella LLP

(57) ABSTRACT

A system and method for modular control of a multi-fuel turbogenerator include separate controllers for controlling fuel supplied to the combustor and power output from the generator. The power controller generates a fuel command based on the required turbine exhaust temperature, where the fuel command is independent of the particular fuel being used. Fuels may include natural gas, diesel, propane, waste gas, or gasoline, for example. The power controller communicates the fuel command and the airflow or calculated air/fuel ratio to the fuel controller which selects an appropriate mode of operation for the injectors. Injector operating modes include one or more pilot modes where fuel is not mixed with air prior to combustion, and one or more premix modes where fuel is highly mixed with air prior to combustion. The fuel controller implements closed-loop feedback control of a fuel metering device and controls the fuel injectors in the appropriate operating mode based on the fuel command, the energy content of the fuel being used, and the air/fuel ratio.

68 Claims, 10 Drawing Sheets

SYSTEM AND METHOD FOR MODULAR CONTROL OF A MULTI-FUEL LOW EMISSIONS TURBOGENERATOR

This application is a continuation of application Ser. No. 09/453,825 filed on Dec. 1, 1999 (pending).

TECHNICAL FIELD

The present invention relates to a system and method for controlling a multi-fuel turbogenerator using a modular control architecture for power and fuel control.

BACKGROUND ART

Turbogenerators typically include a permanent magnet generator coupled to a turbine to convert heat energy produced by combustion of a fuel into electrical energy for distribution to a load, such as a utility grid. A compressor, driven by the turbine, provides compressed air which is heated by the exhaust gases of the combustion process in a recuperator (heat exchanger) prior to being combined with the fuel in the combustor.

Low emission combustion systems have been developed which introduce excess air into the combustor to lower the combustion temperature and reduce production of nitrogen oxides. The introduction of excess air increases the air/fuel ratios (AFR) to values which approach the weak extinction limit of the fuel. When operating in this low-emissions mode, the fuel is well mixed with the air prior to ignition to produce a homogenous mixture to sustain lean-burning combustion which has a lower peak temperature than stoichiometric combustion. Operation of the turbogenerator in this premixed mode is designed for high generator electrical loads which have associated higher turbine and compressor speeds. Transitions between a premixed operating mode and diffusion modes which service lower loads with higher AFRs must be carefully controlled to provide sustained stable combustion and avoid flame outs. The transition between operating modes is highly dependent upon the particular fuel which is being utilized. Various fuels may include natural gas, diesel, propane, waste gas, and gasoline, for example, which have very different combustion characteristics.

BRIEF SUMMARY OF THE INVENTION

In one aspect, the present invention provides a method of operating a turbine engine by combusting air and a fuel having known energy content characteristics in a combustor, comprising selecting an energy rate for delivering thermal energy to the turbine to maintain a selected turbine operating parameter at a selected value; determining the rate of air mass flow into the combustor; determining an air-to-fuel ratio required to maintain the selected thermal energy delivery rate, the air-to-fuel ratio being determined in accordance with the air mass flow rate and the fuel energy content characteristics; and providing the fuel to the combustor at a fuel rate selected in accordance with the air-to-fuel ratio to deliver thermal energy to the turbine at the selected energy rate.

In further aspects, the method includes operating a plurality of fuel injection nozzles to provide the fuel and the air to the combustor at the determined air-to-fuel ratio, which may be in accordance with the fuel energy content characteristics and the rate of air mass flow. Operating the nozzles may further include selectively supplying air and fuel through one or more of the plurality of nozzles in a selected one of a plurality of respective pre-mix nozzle operating modes and selectively supplying only fuel through one or more of the plurality of nozzles in a selected one of a plurality of respective pilot nozzle operating modes, as well as transitioning from a first mode to a second mode.

In another aspect, the present invention provides a turbogenerator comprising an electric generator to generate electric power; a turbine rotationally coupled to the generator to drive the generator; a combustor for combusting air and a fuel having known energy content characteristics to generate hot gas having a known thermal energy content to drive the turbine; a compressor rotationally coupled to the turbine to provide air to the combustor; a turbine controller connected to the turbogenerator for selecting an energy rate for delivering thermal energy to the turbine to maintain a selected turbine operating parameter at a selected value, the controller further connected to the turbogenerator for determining the rate of air mass flow provided by the compressor to the combustor and for determining an air-to-fuel ratio required to maintain the selected thermal energy delivery rate, the air-to-fuel ratio being determined in accordance with the air mass flow rate and the fuel energy content characteristics; and a fuel system connected to the controller for providing the fuel to the combustor at a fuel rate selected in accordance with the air-to-fuel ratio to deliver thermal energy to the turbine at the selected energy rate.

BEST MODE FOR CARRYING OUT THE INVENTION

Figure 1:
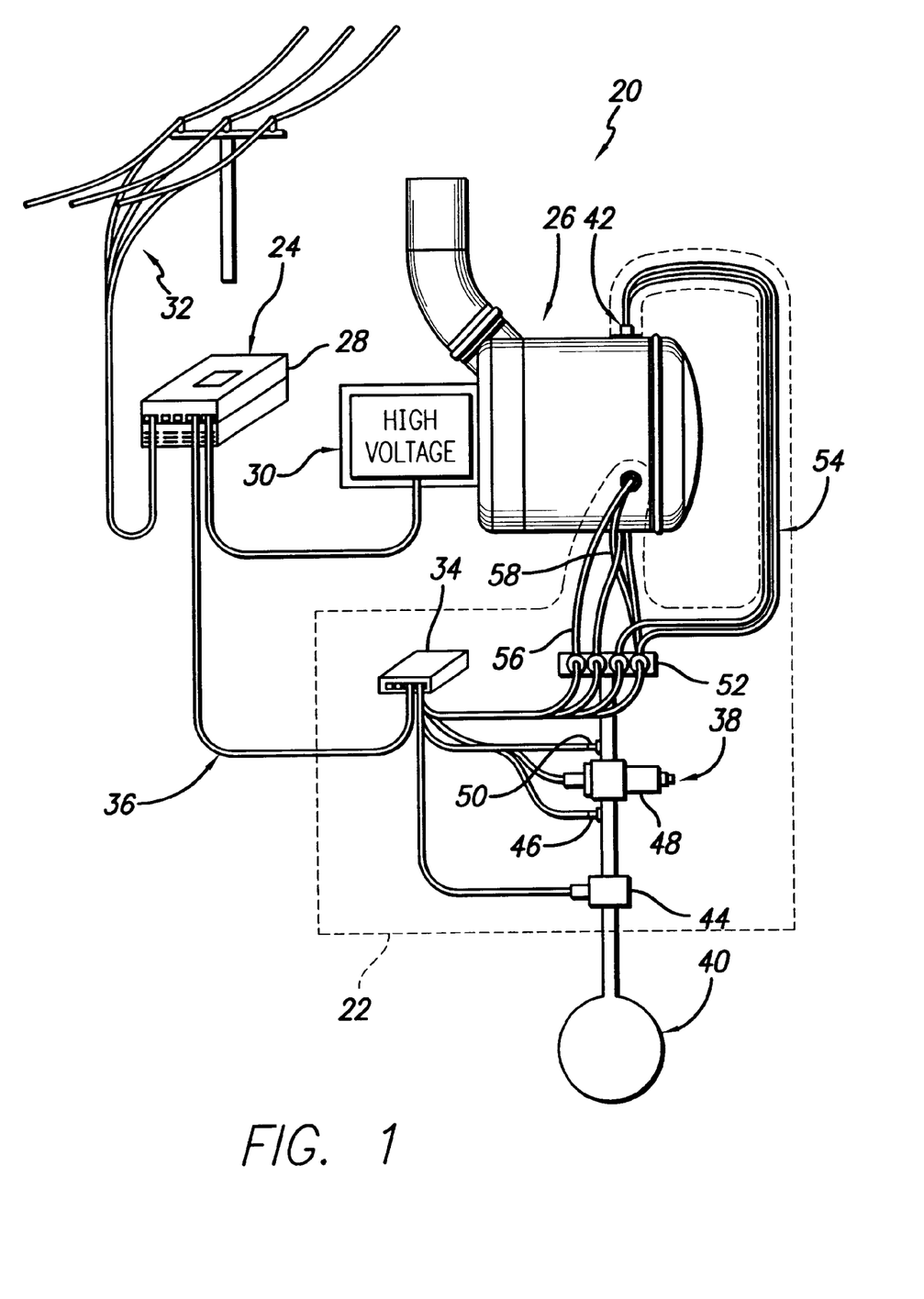
FIG. 1 is a block diagram illustrating one embodiment for a modular multi-fuel turbogenerator control according to the present invention.

Referring now to FIG. 1, a block diagram illustrating one embodiment for a modular multi-fuel turbogenerator control system according to the present invention is shown. System 20 preferably includes a modular fuel control subsystem 22, a modular power control subsystem 24, and a turbogenerator 26. Power control subsystem 24 includes a first controller 28 which performs a variety of functions related to generation and distribution of electrical power produced by electrical generator 30 which is provided to a load, indicated generally by reference numeral 32. Load 32 may be an isolated load or a utility power grid, for example.

Power controller 28 provides a distributed generation power networking system with bi-directional power converters connected via a common DC bus for permitting compatibility between various energy components. Power controller 28 controls the power converters which operate as bi-directional switching converters to provide an interface for a specific energy component to the DC bus. Power controller 28 regulates the DC bus voltage, turbine exhaust temperature (TET), inverter power flow, and power flow of generator 30. A more detailed description of a power controller which may be used to perform the functions of power controller 28 in a modular control according to the present invention may be found in U.S. patent application Ser. No. 09/207,817 filed Dec. 8, 1998 commonly owned by the assignee of the present invention entitled "POWER CONTROLLER," the disclosure of which is hereby incorporated by reference in its entirety.

Controller 28 communicates with a second controller 34 of fuel control subsystem 22 via a communications bus, indicated generally by reference numeral 36. Preferably, communications bus 36 is an external intra-controller communications bus which conforms to a standard bus architecture, such as the RS-485 architecture. Communications bus 36 is used to exchange various information between controller 28 and controller 34 as explained in greater detail with reference to FIGS. 4–5.

Fuel controller 34 receives a fuel command in units independent of the particular fuel being utilized from power controller 28, and controls a fuel delivery subsystem 38 to provide an appropriate quantity of fuel from a source 40 to at least one injector 42. Depending upon the particular application, fuel control subsystem 22 may control delivery of a single fuel, or multiple fuels which are used based on availability. The modular fuel control system of the present invention facilitates use with a variety of fuels including high pressure natural gas, low pressure natural gas, diesel, propane, waste gas, and gasoline, for example. Depending upon the particular fuel being utilized, fuel delivery subsystem 38 may include various types of fuel metering/controlling devices. In one embodiment, fuel delivery subsystem 38 includes a shut-off valve 44 positioned upstream relative to a first pressure transducer 46 (upstream pressure sensor), proportioning valve 48, and a second pressure transducer 50 (downstream pressure sensor). Alternative fuel delivery subsystems may be utilized in place of fuel delivery subsystem 38. For example, for liquid fuels, a pressurization and control system which utilizes helical flow pumps such as described in U.S. Pat. No. 5,752,380 may be used. For gaseous fuels, one or more helical flow compressors (also referred to as vortex compressors or radial flow compressors) may be used as described in U.S. Pat. No. 5,819,524.

Fuel controller 34 controls the quantity and/or pressure of fuel delivered to injector solenoid/manifold block 52. Likewise, fuel controller 34 controls the solenoids of injector block 52 to control delivery of the fuel to one or more injectors 42. In one preferred embodiment, three injectors are used, only two of which are specifically illustrated in FIG. 1. Each injector includes two fuel delivery lines 54 which are independently controllable via injector solenoid block 52 to provide a pilot mode and premix mode of operation. In the pilot mode, fuel is delivered through a corresponding pilot line 56 to a pilot tube of injectors 42 such that the fuel is delivered to the combustion zone of the combustor without being mixed with air. In a premix mode of operation, fuel is delivered via a corresponding premix fuel line 58 to a mixing chamber within injectors 42 where it is mixed with air prior to delivery to the primary combustion zone. Injector operation is explained in greater detail with reference to FIG. 3 and in U.S. Pat. No. 5,850,732, which is hereby incorporated by reference.

Figure 2:
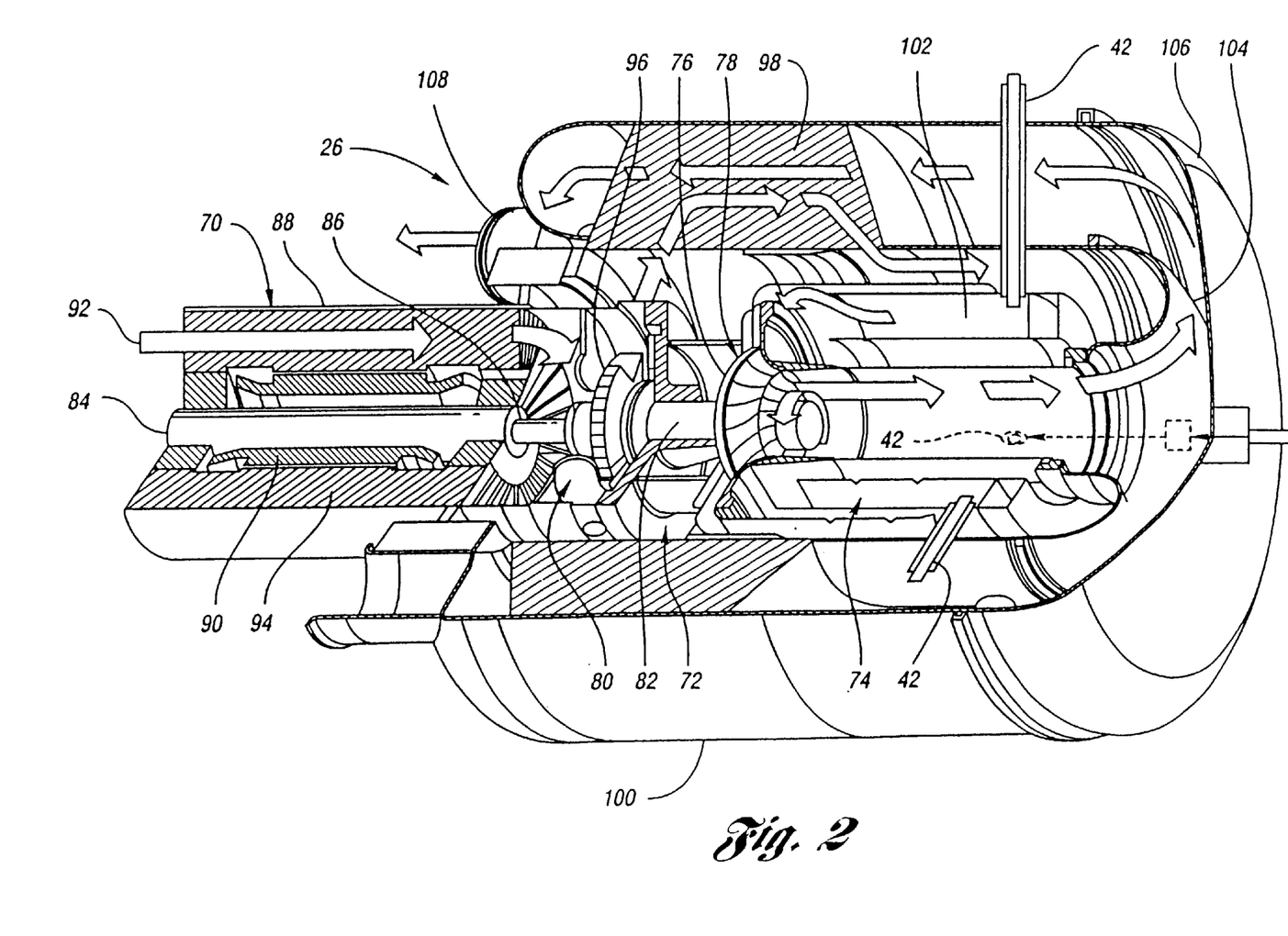
FIG. 2 is a partial cut-away view of a low emissions turbogenerator for use with a modular control system or method according to the present invention.

A partial cut-away view of a low emissions turbogenerator for use with a modular control system or method according to the present invention is shown in FIG. 2. Turbogenerator 26 includes a permanent magnet generator 70 driven by a power head 72. Fuel delivered by injectors 42 is burned in combustor 74 with the exhaust gasses driving turbine wheel 76 of turbine 78 which is connected to compressor 80 by bearing rotor (shaft) 82. Compressor 80 is in turn connected to permanent magnet rotor or sleeve 84 via a tie rod 86.

In operation, ambient air is inducted between outer sleeve 88 and permanent magnet generator stator 90 as indicated generally by arrow 92. The inducted air passes through stator cooling fins 94 before reaching impeller 96 of compressor 80. Rotation of impeller 96 produces compressed air which then passes through heat transfer section 98 of recuperator 100 where it is heated by exhausting exhaust gasses. A portion of the air then travels toward injectors 42 where it may be combined with the fuel within a mixing chamber of injectors 42 prior to entering combustion zone 102 when operating in a premix mode. Alternatively, fuel may be delivered directly to combustion zone 102 via a pilot tube (best illustrated in FIG. 3) such that it is not substantially mixed with air prior to combustion. Hot exhaust gasses are expanded by turbine wheel 78 and flow between combustor dome 104 and exhaust gas dome 106 prior to passing through heat transfer section 98 and being exhausted through exhaust 108.

The low-emissions combustion system is designed to produce low emissions when operating at or near full power. This is accomplished using the premix mode of operation which provides very lean combustion and reduced flame temperatures. When operating in the premix mode, the system operates near its flammability or extinction limit for the particular fuel being utilized. One or more pilot modes are provided to increase the overall operating range of the system. However, transitions between the premix and pilot modes must be carefully controlled to sustain combustion. The system is designed with a large primary zone volume which provides longer residence times to achieve more complete combustion of CO (carbon monoxide) and THC's (total hydrocarbons). The lower flame temperatures produced in the lean-burn premix mode reduce production of oxides of nitrogen.

In a preferred embodiment, the combustion system is operated in three different operating modes depending on the current operating conditions. The operating modes include at least one pilot mode and at least one premix mode. Mode selection is primarily based on the desired air/fuel ratio (AFR) as explained in greater detail below. Preferably, multiple pilot modes are provided. The first pilot mode may include operation of only one of injectors 42. A second pilot mode would include operation of two injectors 42 while the third pilot mode would include operation of all three injectors 42. The mode of operation is controlled by four solenoid valves as illustrated and described with reference to FIG. 1.

During off loading and low to medium power operation, the AFR normally results in operation of the combustion system in the third pilot mode which utilizes all three injectors 42 operating in the pilot mode. During idle, start-up, or severe off loading, the AFR normally results in operation in the first pilot mode using only a single injector 42. When appropriate for the AFR, all three injectors 42 can be operated in a three premix mode where the fuel and air are highly mixed within a mixing chamber of each injector 42 prior to discharge into the combustion chamber as illustrated and described in greater detail with reference to FIG. 3. Alternatively, a single premix or dual premix mode can be selected in one injector or two injectors, respectively, to provide the appropriate AFR.

Figure 3:
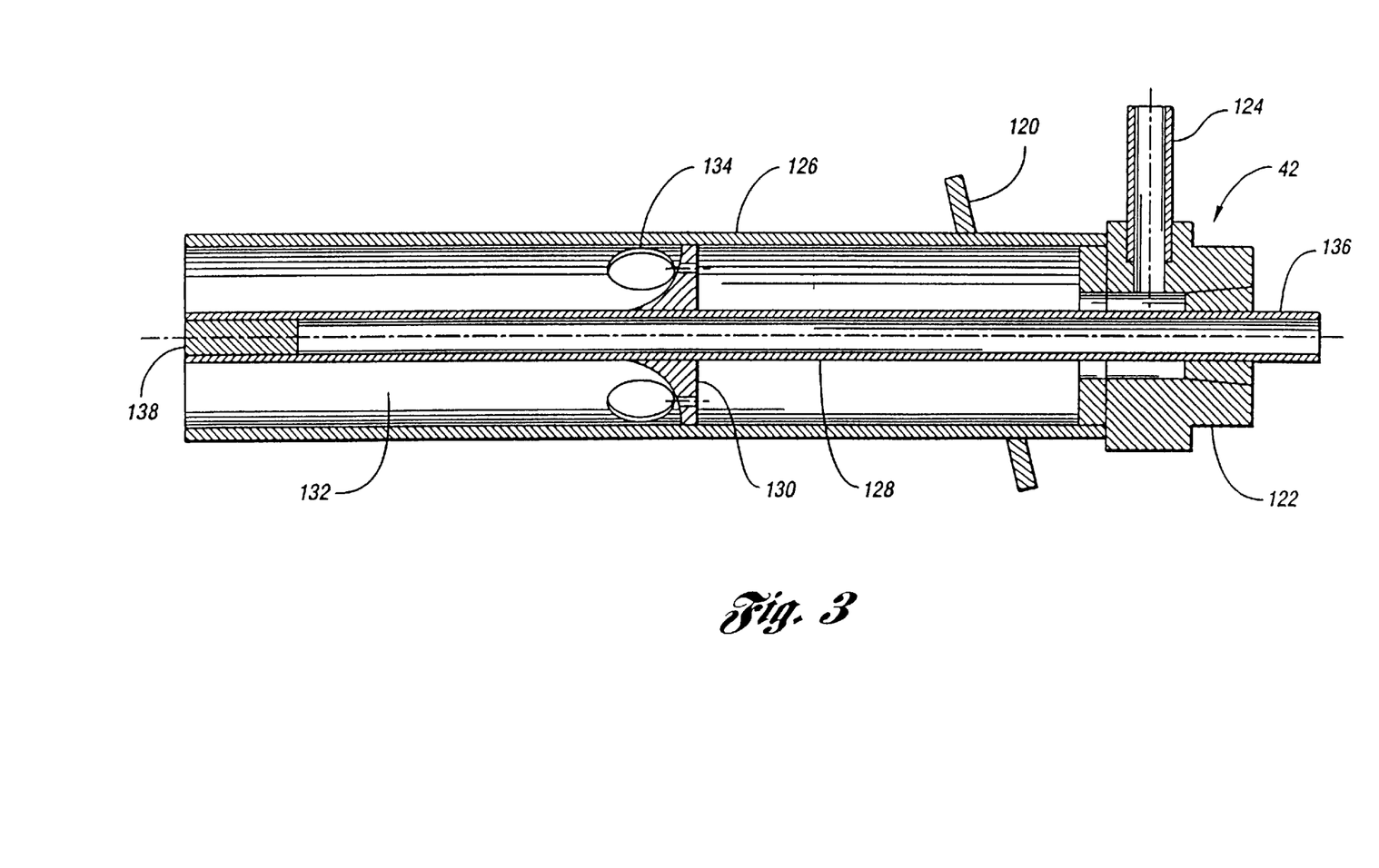
FIG. 3 is a cross-sectional view of a gaseous fuel injector capable of operation in a pilot mode or premix mode for use with a modular turbogenerator control according to the present invention.

A cross-sectional view of a gaseous fuel injector capable of operation in a pilot mode or premix mode for use with a modular turbogenerator control according to the present invention is illustrated in FIG. 3. Injector 42 is mounted to the outer wall of the recuperator using flange 120. A coupler 122 is used to couple premix fuel inlet tube 124 to outer tube 126 of injector 42. Fuel passes through a fuel distribution centering ring 130 into premixing chamber 132 where it is combined with air passing through various apertures 134 prior to being discharged from injector 42 into the primary combustion zone. When operating in the pilot mode, fuel is delivered via pilot fuel inlet 136 through pilot tube 128 to pilot flame holder 138 where it is discharged from injector 42 into the primary combustion zone of the combustor. As such, when operating in the pilot mode, fuel is not substantially mixed with air prior to delivery to the combustion zone.

FIG. 3 provides only one example of an injector which may be used to provide pilot mode and premix mode operation. The injector illustrated in FIG. 3 is preferably used for a gaseous fuel. Various other injectors which may be used with gaseous or liquid fuels are described in detail in U.S. Pat. No. 5,850,732. As will be appreciated by one of ordinary skill in the art, the modular control system of the present invention is independent of the particular injector or combustion system, which may vary depending upon the particular fuel or fuels being utilized.

Figure 4:
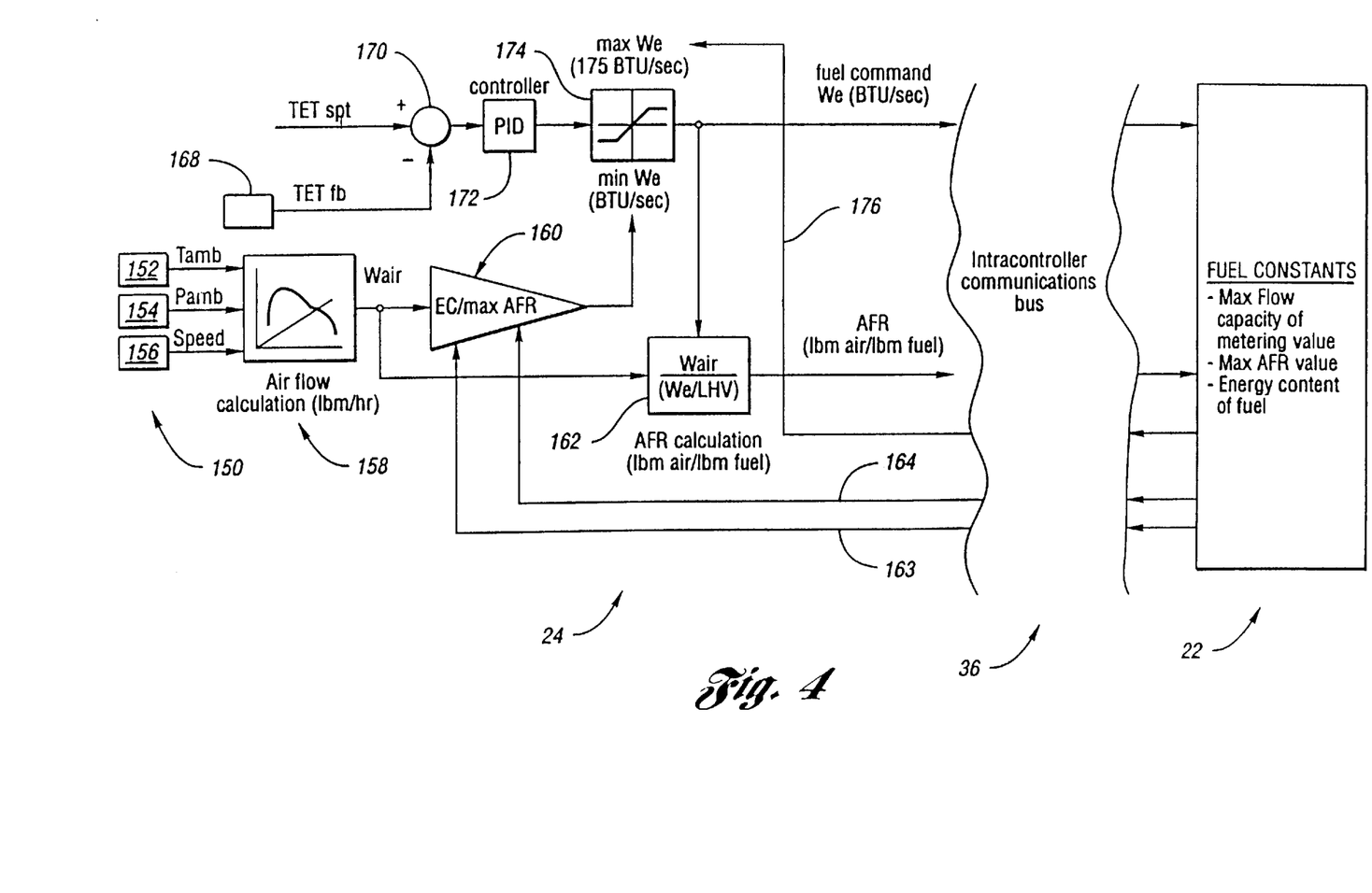
FIG. 4 is a block diagram illustrating operation of one embodiment of a power controller for a modular turbogenerator control according to the present invention.

FIG. 4 is a block diagram illustrating operation of one embodiment of a power controller fuel control system for use in a system or method according to the present invention. As will be appreciated by one of ordinary skill in the art, power controller 24 preferably performs control functions in addition to those illustrated which are not directly related to the modular control system of the present invention and therefore not shown for clarity and convenience. Power controller 24 is preferably a microprocessor based controller with associated volatile and non-volatile memory, conditioning circuitry, and the like. As one of ordinary skill in the art will appreciate, the various functions performed by power controller 24 as illustrated in FIG. 4, may be performed by hardware, software, or a combination of hardware and software. Control logic may be implemented in terms of instructions executed by a microprocessor, or may be implemented in hardware via application specific integrated circuits (ASICs). Similarly, various functions may be completed simultaneously or in parallel while other functions require appropriate sequencing to accomplish the features, advantages, and goals of the present invention.

Power controller 24 determines the current airflow using various sensors 150. In one preferred embodiment, an ambient temperature sensor 152, an ambient pressure sensor 154, and a speed sensor 156 are provided for use in determining the current airflow. Speed sensor 156 may determine the rotational speed of a compressor wheel or equivalently the turbine wheel. In one embodiment, signals provided by sensors 150 are used to access a lookup table 158 to determine the current airflow. Preferably, lookup table 158 is stored in a computer-readable storage medium, i.e. a non-volatile memory associated with, or accessible by power controller 24. Depending upon the particular application, airflow may be alternately obtained by an appropriate sensor rather than being computed as illustrated in FIG. 4. For example, a venturi with associated pressure sensors may be used to directly calculate airflow.

The current airflow, either measured or calculated, ($W_{air}$) is used to determine limits for the fuel command as represented by block 160, and to determine the calculated air/fuel ratio (AFR) as represented by block 162. To establish limits for the fuel command, values corresponding to the energy content of the particular fuel being utilized, represented by reference numeral 163, and the maximum AFR to sustain combustion, represented by reference numeral 164, are communicated by fuel controller 22 via intra-controller communications bus 36 to power controller 24. These values are used in block 160 to determine the lower limit of the fuel command, preferably in terms of energy flow.

As also illustrated in FIG. 4, power controller 24 preferably communicates with a temperature sensor 168 which monitors the turbine exhaust temperature (TET). A desired or target TET is determined by power controller 24 depending upon the particular operating conditions. When the system is started, the target TET is ramped up from the light-off temperature to a final temperature set point over a period of time to warm up the engine. Once the final TET set point has been reached as determined by the TET feedback signal monitored by temperature sensor 168, that temperature is maintained substantially constant throughout the electrical load cycle of the system for steady-state operation, or maintained according to a predetermined value that is based on speed. The feedback signal is compared to the TET target at block 170 to produce an error signal. A closed loop feedback controller 172 is used to generate a signal which reduces the error toward zero. In one embodiment, closed-loop controller 172 is a proportional-integral-differential (PID) controller. As described in greater detail below, the target TET may be modified during transitions between operating modes to improve combustion stability. Operation of a turbogenerator to a turbine exit or exhaust temperature (TET) is described in U.S. patent application Ser. No. 09/080,892 filed May 18, 1998 commonly owned by the assignee of the present invention entitled "Turbogenerator/Motor Control System," the disclosure of which is hereby incorporated by reference in its entirety.

Block 174 generates a fuel command in units independent of a particular fuel being combusted in the turbogenerator based on a required electrical load. In one embodiment, the fuel command generated by block 174 is in terms of energy flow (BTU/sec). A minimum energy flow value is provided by block 160 based on the energy content and maximum AFR for the particular fuel being used as indicated by fuel controller 22. The fuel command is also limited to a maximum energy flow, represented by reference numeral 176 based on the maximum capacity of the fuel metering or delivery device. The maximum capacity is also communicated by fuel controller 22 over intra-controller communications bus 36. The fuel command is used by block 162 to calculate the AFR. The fuel command is also communicated from power controller 24 to fuel controller 22 via the intra-controller communications bus 36. Likewise, the computed AFR is provided to fuel controller 22 via the intra-controller communications bus 36. Preferably, the maximum AFR value for each injector operating mode is empirically determined for each fuel type.

Thus, power controller 24 will not generate a fuel command that would cause the AFR to exceed the particular limits of the fuel system that would cause the engine to flame out. This is assured by calculating the airflow and dividing by the maximum AFR value received from fuel controller 22. The result of this calculation provides the minimum fuel flow which is then divided by the energy content of the fuel to produce the minimum energy flow required to sustain combustion. The minimum energy flow provides the lower limit of the commanded fuel output to fuel controller 22. Likewise, an upper limit is provided based on values indicated by fuel controller 22 such that power controller 24 will not demand more fuel than the particular fuel system can supply.

Figure 5:
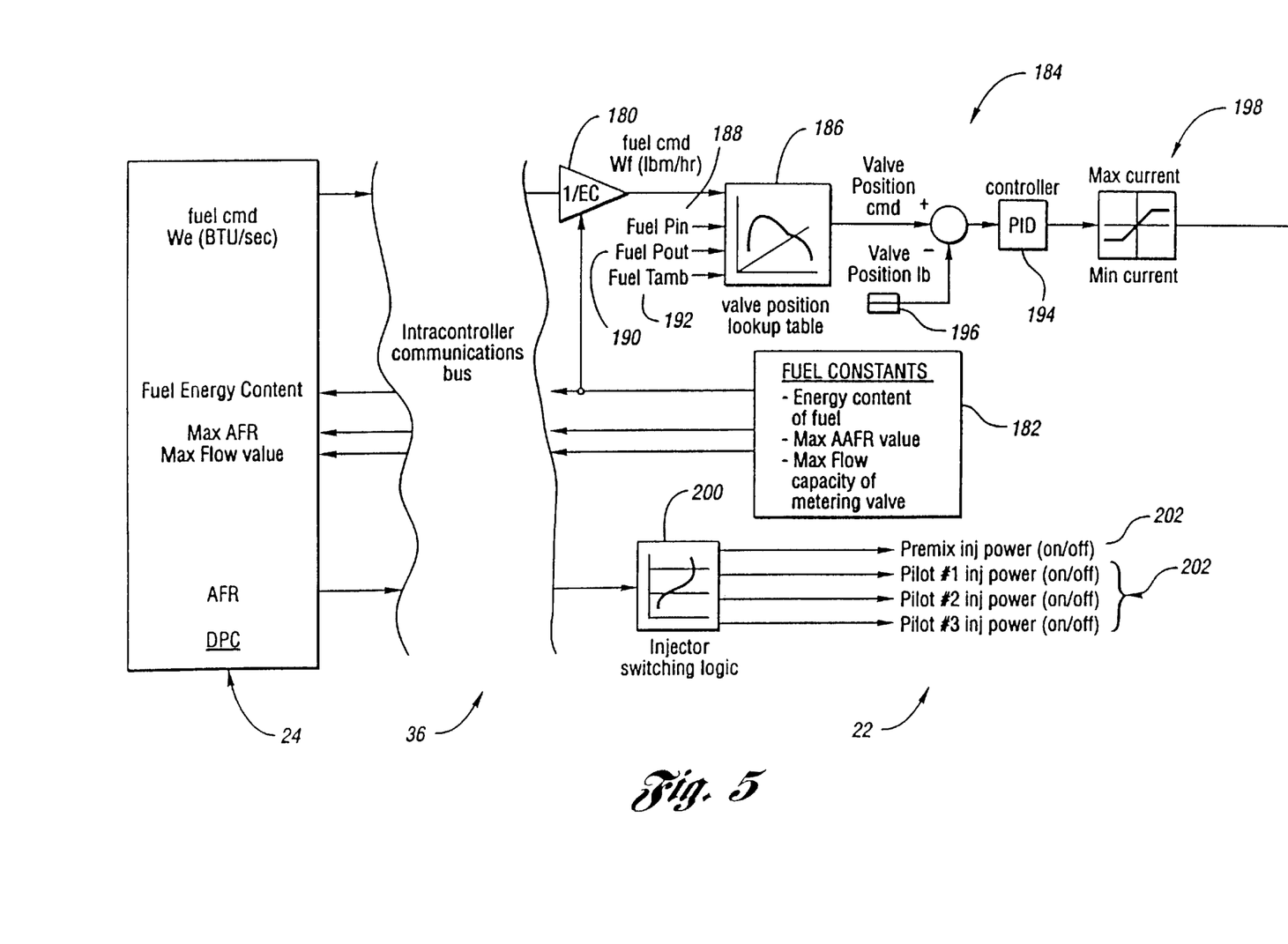
FIG. 5 is a block diagram illustrating operation of one embodiment of a fuel control system for a modular turbogenerator control according to the present invention.

FIG. 5 is a block diagram illustrating operation of one embodiment of a fuel control subsystem for a modular turbogenerator controller according to the present invention. Similar to the power controller 24, fuel controller 22 preferably includes a microprocessor based controller which performs various functions specific to the fuel control subsystem using appropriate hardware and/or software. Fuel controller 22 receives a fuel command, preferably in terms of energy flow, from power controller 24. The fuel command is processed by fuel controller 22 as indicated by block 180 to convert the fuel command to a quantity of fuel to be delivered to at least one injector based on the energy content of the fuel. Various fuel constants, such as the energy content of the fuel, may be stored in a memory 182 associated with, or in communication with fuel controller 22. Once the energy command has been converted to a fuel command, fuel controller 22 controls fuel delivery subsystem 38 to deliver the appropriate quantity of fuel to one or more injectors. In one embodiment, a fuel command ($W_f$), fuel temperature, and fuel pressure across the proportioning valve are used to determine an appropriate valve position using a lookup table 186. These values are provided by corresponding pressure sensors 188, 190, and a fuel ambient temperature sensor 192.

The valve position or pump speed (depending on what metering device is used) is controlled by a corresponding feedback controller 194 which preferably implements a PID feedback control using valve position feedback from an appropriate sensor 196. The valve position or pump speed is controlled by controlling the current supplied to the valve or pump, respectively, as indicated by block 198 to reduce the error toward zero. To provide a flexible control strategy which can be used with a variety of different fuels, the present invention allows the user to enter various fuel constants or fuel indices based on the physical fuel characteristics associated with the particular fuel being utilized as represented by block 182 of FIG. 5. In one preferred embodiment, physical characteristics of a gaseous fuel are incorporated into the control functions in the form of two indices as follows:

$$FUEL_{I1} = SG * \left(\frac{1327}{HHV_{vol}}\right)^2 \text{ and}$$

$$FUEL_{I2} = \frac{HHV_{vol}}{1668 * SG}$$

where SG represents the specific gravity of the fuel with respect to air and $HHV_{vol}$ represents the fuel gas higher heating value in Btu/SCF. The $FUEL_{I1}$ index is a parameter related to the fuel density and energy content and is used in controlling the fuel metering device to deliver an appropriate quantity of fuel to provide the commanded energy flow. The $FUEL_{I2}$ index is a parameter proportional to the fuel gas higher heating value on a mass basis and is used to modify the operating mode transitions based on AFR as described in greater detail below.

In one embodiment, the $FUEL_{I1}$ index parameter is used to modify the commanded position of the fuel proportioning valve so that the same fuel metering hardware can be utilized with multiple fuels. Preferably, empirical data relative to valve position and fuel flow is stored in the form of a look-up table in a computer readable storage media accessible by the fuel controller. The empirical data may be stored in the form of sampled data with intermediate points being interpolated. Alternatively, an equation representing the proportioning valve response may be stored. The equation may be analytically determined based on the construction of the proportioning valve, or empirically determined using a curve fitting routine based on collected data.

Figure 6:
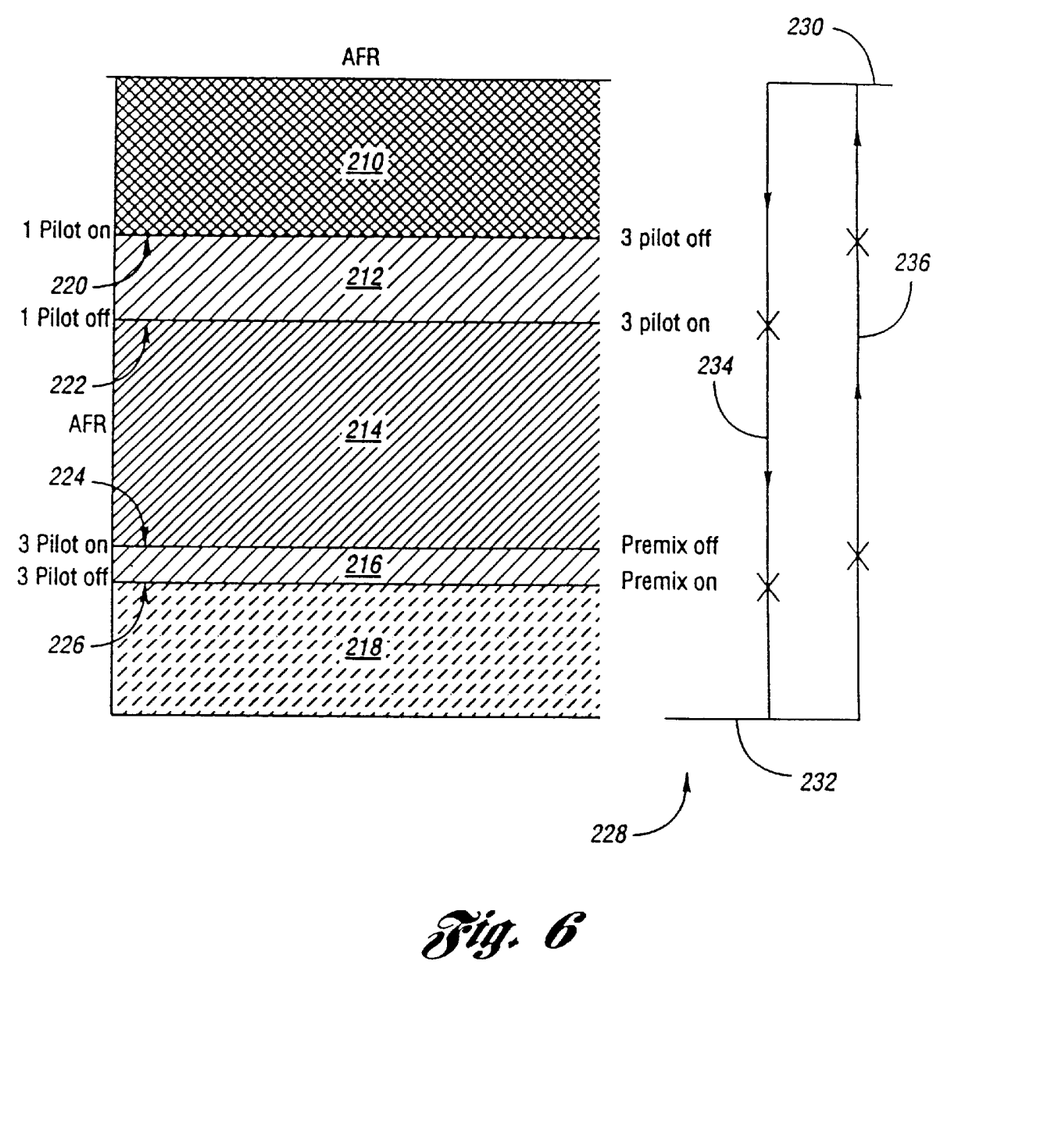
FIG. 6 is a diagram illustrating transitions between injector control modes including hysteresis bands for a modular turbogenerator control according to the present invention.

Fuel controller 22 also receives the AFR from power controller 24 via the intra-controller communications bus 36. The AFR is used to select or determine an appropriate operating mode for one or more injectors as represented by block 200. In one embodiment of the present invention, three different operating modes are provided. Block 200 controls the selection of the operating mode as seen in FIG. 6, in addition to the sequencing of injectors during transitions between operating modes as illustrated and described in greater detail with reference to FIGS. 7–10. In this embodiment, the operating modes include a premix mode 202 which energizes all of the premix injectors in such a way as to supply fuel to the premix chamber through the coupler, and a pilot mode which is selected by controlling one or more injectors to supply fuel to the pilot tubes of the injectors as indicated generally by reference numeral 204.

A diagram illustrating transitions between control modes based on AFR including hysteresis bands for a modular turbogenerator control according to the present invention is provided in FIG. 6. The diagram illustrates a first pilot mode region 210, a first hysteresis band 212, a second pilot mode region 214, a second hysteresis band 216, and a premix mode region 218. Hysteresis bands 212 and 216 are provided to eliminate oscillation between adjacent operating modes when the operating region is near a transition line. Hysteresis bands 212 and 216 may be empirically determined (or theoretically calculated) based upon the particular combustion system and fuel being utilized.

Operating mode transitions are indicated by transition lines 220, 222, 224, and 226. The actual values of AFR (whether determined directly or indirectly based on generator output power) which correspond to transition lines 220, 222, 224, and 226 preferably vary based on the particular fuel being utilized. In one embodiment, a fuel index parameter, $FUEL_{I2}$, is used to adjust the transition values relative to a default or standard value as described above. Transitions are completed over a predetermined period of time as illustrated and described with reference to FIGS. 7–10. To determine the current operating mode within hysteresis bands 212 and 216, it is necessary to determine the previous mode and/or direction of transition as indicated generally by transition diagram 228. Line 230 represents idle conditions while line 232 represents full power conditions. Beginning at idle, the system is operating in the first pilot mode region 210 which preferably energizes a single injector. As the electrical load increases, the operating mode follows line 234, whereas a decrease in electrical load follows line 236. For example, as the electrical load increases and transition line 222 is crossed, the operating mode changes from the first pilot mode (one pilot) to the second pilot mode (three pilot). A subsequent reduction in the load would follow line 236 such that the first pilot mode is not activated until transition line 220 is crossed. The control operates in a similar fashion with respect to hysteresis band 216.

In one preferred embodiment, operating mode transitions are limited among a subset of available injector operating modes based on the energy content of the fuel being utilized. As the energy of the fuel decreases, so does flame stability. As such, users may select a low BTU or medium BTU mode to improve flame stability at the cost of increased emissions and/or lower efficiency. Low BTU operation typically requires higher fuel gas supply pressures which may be supplied by an external compressor, for example. In addition, selection of a low BTU fuel operating mode to increase flame stability preferably limits operation of the injectors to premix mode only with all injectors energized. In addition, light-off TET may be increased during transitions between open loop light and closed loop acceleration to further improve stability during lighting. Likewise, operation in a medium BTU fuel mode preferably includes only a subset of the available injector operating modes. For example, a medium BTU mode preferably prevents switching to single injector operation under all operating modes, operating in the multiple injector pilot and premix modes.

Figure 7:
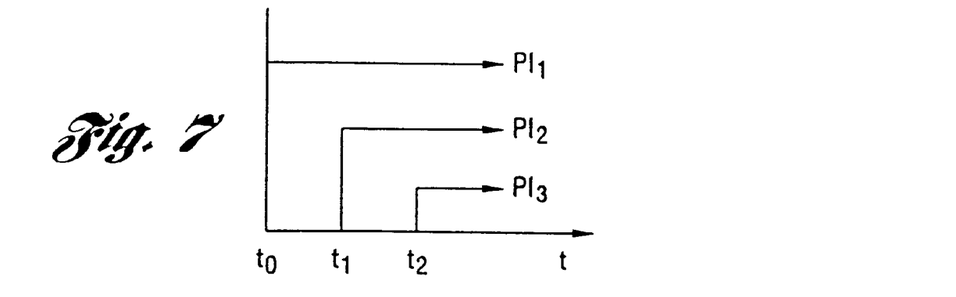
FIGS. 7–10 are timing or sequencing diagrams illustrating injector control for transitions between a premix mode and pilot modes within a fuel system controller of a modular turbogenerator control according to the present invention.
Figure 8:
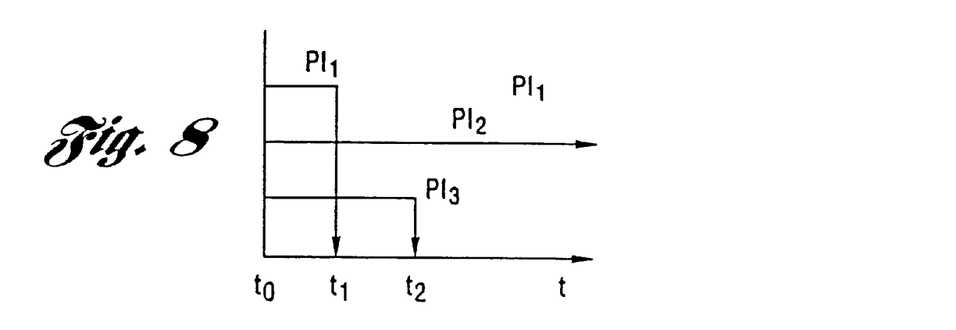
Figure 9:
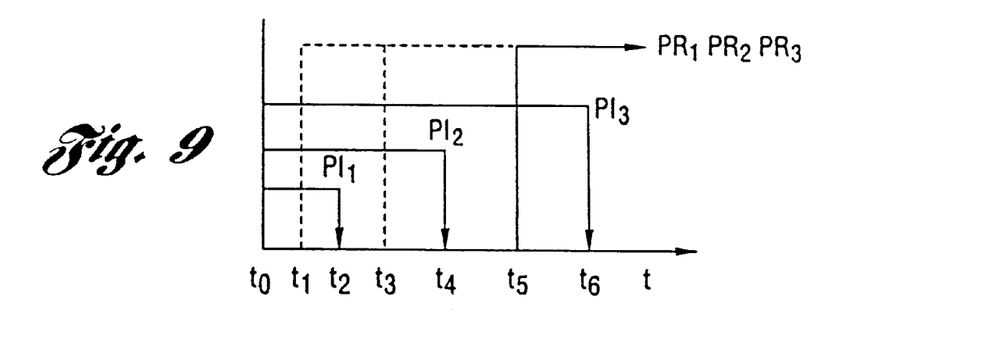
Figure 10:
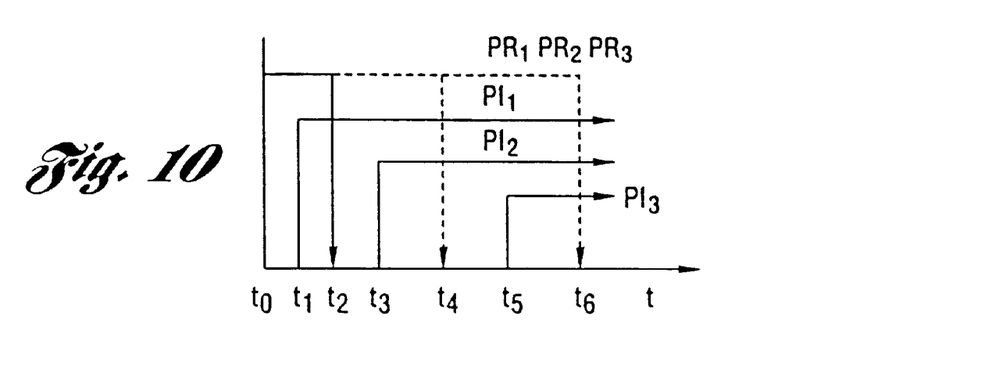

FIGS. 7–10 are timing or sequencing diagrams which illustrate injector control during transitions between operating modes within a fuel system controller of a modular turbogenerator control according to the present invention. FIG. 7 illustrates control of three injectors during a transition from a single pilot mode to a three pilot mode. FIG. 8 illustrates a control sequence for a transition in the opposite direction from three pilot mode to single pilot mode. FIG. 9 illustrates alternative control sequencing strategies for transitions between three pilot mode and a premix mode. FIG. 10 illustrates alternative control sequencing for transitions from premix mode to three pilot mode.

In FIGS. 7–10, the time axis is used to illustrate the relative time sequence of activating or deactivating each injector which is capable of operating in a pilot mode (PI) or in a premix mode (PR). The sequencing of the injectors during a transition between operating modes may depend upon the particular construction of the combustion system. In a preferred embodiment, injectors are positioned within the combustor to tangentially inject fuel into the combustor. For this arrangement, it is desirable to follow the swirl pattern created by the injectors when transitioning from single pilot mode to three pilot mode. This allows the additional injectors to be ignited by the flame produced by the single injector active during the first pilot mode. Conversely, when transitioning from a higher to a lower load, corresponding to a transition from three pilot mode to single pilot mode, it is desirable to sequence injector deactivation to oppose the swirl pattern to improve combustion stability. A further improvement to combustion stability may be provided by energizing the ignitor during transitions. Alternatively, or in combination, additional fuel may be provided during transitions to promote combustion stability. Preferably, additional fuel is provided by increasing the target or desired turbine exhaust temperature (TET).

In the single pilot mode, a single injector ($PI_1$) is active at time $t_0$ as illustrated in FIG. 7. To transition to the dual pilot mode, the second injector ($PI_2$) is energized at time $t_1$ while the third injector ($PI_3$) is energized or activated at time $t_2$. This sequencing pattern follows the swirl or rotational pattern created by the tangential injection of fuel within the combustor.

A transition from the dual pilot mode to the single pilot mode having a sequence which opposes the swirl pattern is illustrated in FIG. 8. In this transition, the first injector ($PI_1$) is deactivated at time $t_1$ followed by the third injector ($PI_3$) at time $t_2$ while the second injector ($PI_2$) remains on.

Alternative sequencing strategies are illustrated by dotted lines to transition from a second pilot mode to the premix mode in FIG. 9. For the premix mode, all of the premix injectors ($PR_1$, $PR_2$, and $PR_3$) may be activated at time $t_1$, $t_3$, or alternatively $t_5$ by supplying fuel to the coupler of the injectors. As indicated in the diagram, each alternative includes some overlap with operation of the injectors in the pilot modes. For example, if the premix injectors are activated at time $t_1$, all three injectors have fuel supplied to both the premix port and pilot port simultaneously for varying amounts of time. In this scenario, the first pilot injector ($PI_1$) is deactivated at time $t_2$ while the second and third pilot injectors ($PI_2$ and $PI_3$) are deactivated at time $t_4$ and $t_6$, respectively. The second and third alternatives for transitioning from the premix mode provide less overlap where fuel is supplied to both the pilot and premix ports.

FIG. 10 illustrates alternative strategies for transitioning from the premix mode to the three pilot mode. Each of these strategies follows the swirl pattern created by the tangential injection of fuel within the combustor. This facilitates ignition of the pilot flames for the injectors. As illustrated, fuel supplied to the premix ports may be shut off at time $t_2$, $t_4$, or $t_6$. Injectors 1, 2, and 3 are switched to pilot mode at time $t_1$, $t_3$, and $t_5$, respectively.

Figure 11:
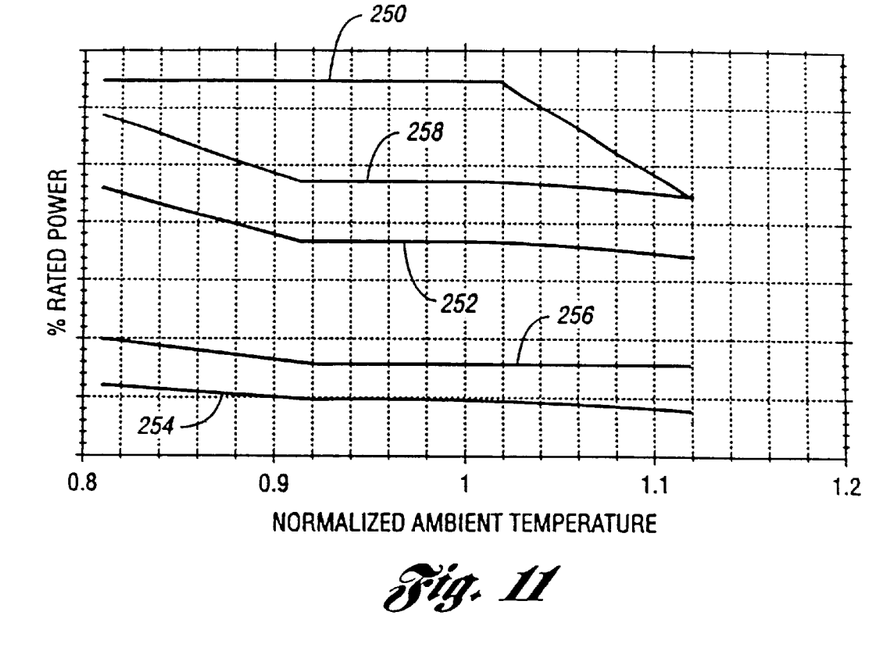
FIG. 11 is a graph illustrating operating mode transitions based on generator output power as a function of normalized ambient temperature in a system using a modular turbogenerator control according to the present invention.

A graph illustrating operating mode transitions based on generator output power as a function of normalized ambient temperature is shown in FIG. 11. FIG. 11 illustrates lines of constant AFR which may be used to control the operating mode of the injectors. Line 250 represents the full rated power of the engine. Line 252 corresponds to the AFR to transition from the premix mode to the three pilot mode. Line 254 corresponds to the transition line to transition from the three pilot mode to the single pilot mode. When moving from lower to higher power, transition lines 256 and 258 are used to switch from the single pilot mode to the three pilot mode, and from the three pilot mode to the premix mode, respectively. As such, injector operating modes may be determined, if desired, based on generator power output which is essentially an indirect determination of AFR rather than operating based on a direct determination as described above with reference to FIG. 6.

Figure 12:
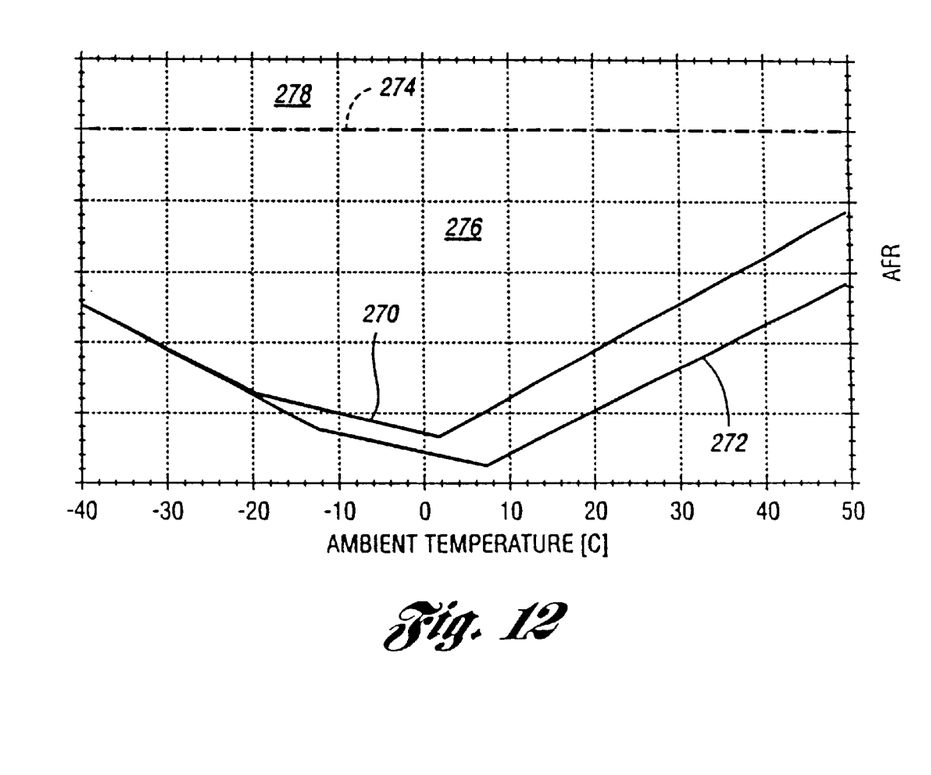
FIG. 12 is a graph illustrating air/fuel ratio (AFR) at full power as a function of ambient temperature for two turbine exhaust temperatures in a modular turbogenerator control according to the present invention.

A graph illustrating air/fuel ratio at full power as a function of ambient temperature for two turbine exhaust temperatures is shown in FIG. 12. Line 270 represents AFR for a TET of about 1050 F. Line 272 corresponds to the AFR for a TET of about 1100 F. Line 274 represents the transition line between the premix mode corresponding to region 276 and the three pilot mode corresponding to region 278. As this graph illustrates, the present invention allows full power operation in the low-emissions premix mode over the entire range of anticipated ambient temperatures.

Figure 13:
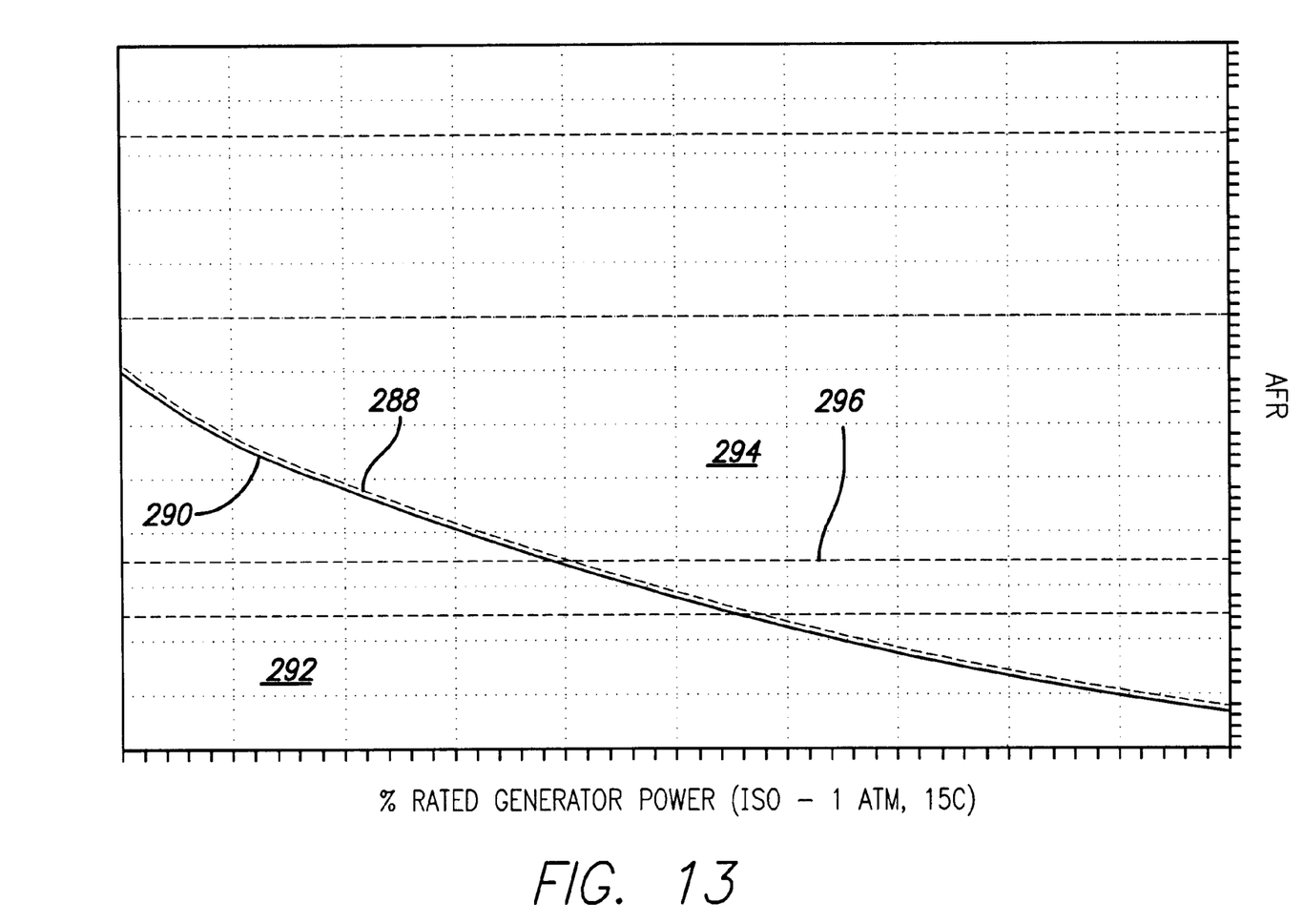
FIG. 13 is a graph illustrating variation of AFR over a range of generator output power for two turbine exhaust temperatures in addition to selection of operating modes for a modular turbogenerator control according to the present invention.

FIG. 13 is a graph illustrating variation of AFR over a range of generator output power for two turbine exhaust temperatures. The graph also provides transition lines for a selection of operating modes for a modular turbogenerator control according to the present invention. The graph of FIG. 13 illustrates the variation of AFR for TET of about 1050 F as represented by line 288, and 1100 F as represented by line 290. As the system is operated near full rated power, it transitions into premix mode region 292 from three pilot mode region 294 with an appropriate hysteresis band as previously described. Likewise, as the power level is decreased, the system transitions from the premix mode to the second pilot mode when the AFR exceeds the corresponding transition line 296.

Figure 14:
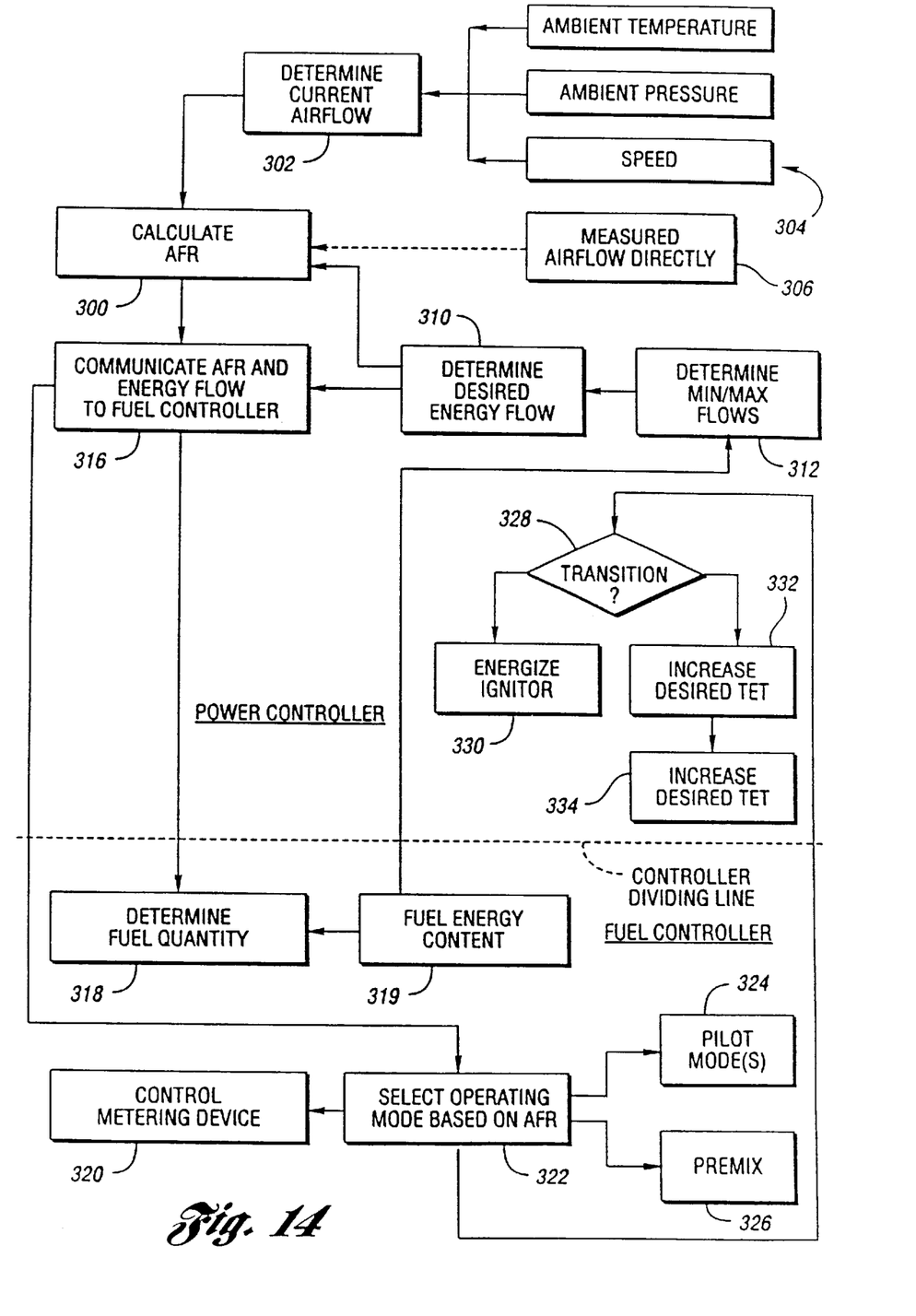
FIG. 14 is a flow chart illustrating operation of a system or method for modular control of a turbogenerator according to the present invention.

A flowchart illustrating operation of a system or method for modular control of a turbogenerator according to the present invention is illustrated in FIG. 14. The current airflow is determined as represented by block 302. This determination may be made using a lookup table referenced by ambient air temperature, air pressure, and turbine or compressor speed as indicated generally by reference numeral 304. Alternatively, current airflow may be determined directly by measuring the actual airflow through the turbogenerator as represented by block 306.

The desired energy flow is determined as represented by block 310. This desired energy flow is based on a turbogenerator operating parameter such as turbine exhaust temperature and is generated in units which are independent of the particular fuel being used by the system. This provides the separation of control functions to achieve modularity. Preferably, the fuel command is limited by lower and upper limits based on a minimum energy flow to sustain stable combustion, and a maximum energy flow based on the maximum fuel flow and energy content of the fuel that the metering device is capable of delivering as represented by block 312.

From the current airflow 302 and desired energy flow 310, the AFR is calculated as represented by block 300. Both the AFR and desired energy flow 310 are communicated from the power controller or first controller to the fuel controller or second controller as represented by block 316. Preferably, the fuel command is communicated via an external communications bus. A quantity of fuel to be supplied to the combustor is determined, as represented by block 318, based on the fuel energy content 319 in the second controller. Fuel supplied to the turbogenerator is then controlled based on the determined quantity of fuel as represented by block 318 by the metering device block 320. In an alternative arrangement the current airflow 302 and desired energy flow 310 are determined in the power controller and communicated to the fuel controller where the AFR is then calculated. In other words, block 300 drops from the first controller to the second controller and block 316 communicates only energy flow and airflow to the second controller.

In one preferred embodiment, an operating mode for at least one injector of the turbogenerator is selected based at least in part on the AFR as represented by block 322. The operating mode may include a premix mode 326 and a pilot or diffusion mode as represented by block 324. One or more injectors may be activated or energized in either operating mode. Preferably, all injectors are activated in the premix mode while varying numbers of injectors are activated in a plurality of pilot modes.

Combustion stability may be improved by energizing the ignitor of the turbogenerator during transitions 328 between operating modes as represented by block 330. In addition, or alternatively, combustion stability may be improved by increasing the quantity of fuel supplied to the injectors during transitions between control modes as represented by block 332. In one embodiment, fuel is increased by modifying a desired operating temperature, i.e. the turbine exhaust temperature, during a load transition as represented by block 334.

Thus, the present invention provides a modular control for a turbogenerator which has the capacity to run on a variety of different fuels without significant system modification. Control is separated into a power controller and a fuel controller with communication provided through an intra-controller bus. This approach allows the same turbogenerator to run on a variety of available fuels with only a single fuel system change, thus making it more versatile and cost effective than current systems.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of operating a turbine engine by combusting air and a fuel having known energy content characteristics in a combustor, comprising:

selecting an energy rate for delivering thermal energy to the turbine to maintain a selected turbine operating parameter at a selected value;

determining the rate of air mass flow into the combustor;

determining an air-to-fuel ratio required to maintain the selected thermal energy delivery rate, the air-to-fuel ratio being determined in accordance with the air mass flow rate and the fuel energy content characteristics; and providing the fuel to the combustor at a fuel rate selected in accordance with the air-to-fuel ratio to deliver thermal energy to the turbine at the selected energy rate.

2. The method of claim 1, further comprising:

operating a plurality of fuel injection nozzles to provide the fuel and the air to the combustor at the determined air-to-fuel ratio.

3. The method of claim 2, wherein operating the nozzles comprises:

operating the plurality of fuel injection nozzles in accordance with the fuel energy content characteristics and the rate of air mass flow.

4. The method of claims 2 or 3, wherein operating the nozzles comprises:

selectively supplying air and fuel through one or more of the plurality of nozzles.

5. The method of claims 2 or 3, wherein operating the nozzles comprises:

selectively supplying only fuel through one or more of the plurality of nozzles.

6. The method of claim 1, wherein the turbine operating parameter is the turbine exhaust temperature.

7. The method of claim 1, wherein determining the air-to-fuel ratio comprises:

determining a maximum air-to-fuel ratio in accordance with the fuel energy content characteristics.

8. The method of claim 4, wherein determining the air-to-fuel ratio comprises:

determining a maximum air-to-fuel ratio in accordance with the fuel energy content characteristics and the number of nozzles operated to supply, air and fuel.

9. The method of claim 5, wherein determining the air-to-fuel ratio comprises:

determining a maximum air-to-fuel ratio in accordance with the fuel energy content characteristics and the number of nozzles operated to supply fuel.

10. The method of claim 1, wherein the fuel rate is further selected in accordance with a maximum fuel delivery rate associated with the turbine engine.

11. The method of claims 1 or 10, wherein providing the fuel comprises:

controlling a fuel supply valve to provide the fuel at the selected fuel rate from a fuel supply.

12. The method of claim 11, wherein controlling the fuel supply valve comprises:

controlling the fuel supply valve in accordance with any one or more of the fuel temperature, the fuel energy content characteristics, the fuel specific gravity, the air-to-fuel ratio, and the fuel pressure across the fuel supply valve.

13. The method of claim 12, wherein controlling the fuel supply valve further comprises:

controlling the fuel supply valve in accordance with a look-up table including valve position data and corresponding fuel flow data.

14. The method of claims 1 or 10, wherein providing the fuel comprises:

controlling a fuel pump to provide the fuel at the selected fuel rate from a fuel supply.

15. The method of claim 14, wherein controlling the fuel pump comprises:

controlling the fuel pump in accordance with any one or more of the fuel temperature, the fuel energy content characteristics, the fuel specific gravity, and the air-to-fuel ratio.

16. The method of claim 1, further comprising:

selecting the fuel from among a plurality of available fuels, each available fuel having known energy content characteristics.

17. The method of claim 16, wherein selecting the fuel comprises:

selecting the fuel from among a plurality of available gaseous and liquid fuels.

18. The method of claim 1, wherein determining the air mass flow rate comprises:

determining the rate of air mass flow based upon any one or more of a turbine compressor speed, ambient air temperature, and ambient air pressure.

19. The method of claim 1, wherein determining the air mass flow rate comprises:

measuring the rate of air mass flow.

20. The method of claim 2, wherein operating the plurality of fuel injection nozzles comprises:

selectively supplying air and fuel through one or more of the plurality of nozzles in a selected one of a plurality of respective pre-mix nozzle operating modes; and selectively supplying only fuel through one or more of the plurality of nozzles in a selected one of a plurality of respective pilot nozzle operating modes.

21. The method of claim 20, wherein providing the fuel further comprises:

transitioning from a first nozzle operating mode to a second nozzle operating mode.

22. The method of claim 21, wherein transitioning from a first nozzle operating mode to a second nozzle operating mode comprises:

transitioning from a first nozzle operating mode to a second nozzle operating mode in response to a change in the value selected for the turbine operating parameter.

23. The method of claim 22, wherein the turbine operating parameter is any one of turbine load, turbine speed, or turbine exhaust temperature.

24. The method of claims 22 or 23, wherein transitioning from a first nozzle operating mode to a second nozzle operating mode comprises:

transitioning from a first nozzle operating mode to a second nozzle operating mode in accordance with the value of the change in the turbine operating parameter selected value.

25. The method of claim 24, wherein transitioning in accordance with the value of the change in the turbine operating parameter selected value further comprises:

selecting the second operating mode in accordance with the fuel energy content characteristics.

26. The method of claim 21, wherein transitioning from a first nozzle operating mode to a second nozzle operating mode further comprises:

transitioning from a first nozzle operating mode to a second nozzle operating mode over a predetermined period of time selected in accordance with the fuel energy content characteristics.

27. The method of claim 26, wherein transitioning from a first nozzle operating mode to a second nozzle operating mode further comprises:

energizing an igniter in the combustor.

28. The method of claim 26, wherein transitioning from a first nozzle operating mode to a second nozzle operating mode further comprises:

increasing the fuel rate while transitioning.

29. The method of claim 27, wherein transitioning from a first nozzle operating mode to a second nozzle operating mode further comprises:

increasing the fuel rate while transitioning.

30. The method of claim 28, wherein transitioning from a first nozzle operating mode to a second nozzle operating mode further comprises:

energizing an igniter in the combustor.

31. The method of claim 26, wherein the turbine operating parameter is the turbine exhaust temperature, and transitioning from a first nozzle operating mode to a second nozzle operating mode further comprises:

increasing the selected turbine exhaust temperature value while transitioning.

32. The method of claim 31, further comprising:

increasing the fuel rate while transitioning.

33. The method of claim 32, further comprising:

energizing an igniter in the combustor.

34. The method of claim 20, wherein operating in a pilot nozzle operating mode comprises:

sequentially energizing the fuel injection nozzles to promote swirling in the combustor.

35. A turbogenerator, comprising:

an electric generator to generate electric power;

a turbine rotationally coupled to the generator to drive the generator;

a combustor for combusting air and a fuel having known energy content characteristics to generate hot gas having a known thermal energy content to drive the turbine;

a compressor rotationally coupled to the turbine to provide air to the combustor;

a turbine controller connected to the turbogenerator for selecting an energy rate for delivering thermal energy to the turbine to maintain a selected turbine operating parameter at a selected value, the controller further connected to the turbogenerator for determining the rate of air mass flow provided by the compressor to the combustor and for determining an air-to-fuel ratio required to maintain the selected thermal energy delivery rate, the air-to-fuel ratio being determined in accordance with the air mass flow rate and the fuel energy content characteristics; and a fuel system connected to the controller for providing the fuel to the combustor at a fuel rate selected in accordance with the air-to-fuel ratio to deliver thermal energy to the turbine at the selected energy rate.

36. The turbogenerator of claim 35, wherein the fuel system further comprises:

a plurality of fuel injection nozzles fluidly connected to the combustor to provide the fuel and the air to the combustor in the determined air-to-fuel ratio.

37. The turbogenerator of claim 36, wherein the fuel system further comprises:

a fuel controller for operating the plurality of fuel injection nozzles in accordance with the fuel energy content characteristics and the rate of air mass flow.

38. The turbogenerator of claim 37, wherein the fuel system further comprises:

a fuel controller for selectively supplying air and fuel through one or more of the plurality of nozzles.

39. The turbogenerator of claim 37, wherein the fuel system further comprises:

a fuel controller for selectively supplying only fuel through one or more of the plurality of nozzles.

40. The turbogenerator of claim 35, wherein the turbine operating parameter is the turbine exhaust temperature.

41. The turbogenerator of claim 35, wherein the turbine controller comprises:

a turbine controller for determining a maximum air-to-fuel ratio in accordance with the fuel energy content characteristics.

42. The turbogenerator of claim 41, wherein the turbine controller comprises:

a turbine controller for determining a maximum air-to-fuel ratio in accordance with the fuel energy content characteristics and the number of nozzles operated to supply air and fuel.

43. The turbogenerator of claim 39, wherein the turbine controller comprises:

a turbine controller for determining a maximum air-to-fuel ratio in accordance with the fuel energy content characteristics and the number of nozzles operated to supply fuel.

44. The turbogenerator of claim 39, wherein the fuel system further comprises:

a fuel controller for selecting the fuel rate in accordance with a maximum fuel delivery rate associated with the fuel system.

45. The turbogenerator of claims 44, wherein the fuel system further comprises:

a fuel controller for controlling a fuel supply valve to provide the fuel at the selected fuel rate from a fuel supply.

46. The turbogenerator of claim 45, wherein the fuel system comprises:

a fuel controller for controlling the fuel supply valve in accordance with any one or more of the fuel temperature, the fuel energy content characteristics, the fuel specific gravity, the air-to-fuel ratio, and the fuel pressure across the fuel supply valve.

47. The turbogenerator of claim 46, wherein the fuel system further comprises:

a fuel controller for controlling the fuel supply valve in accordance with a look-up table including valve position data and corresponding fuel flow data.

48. The turbogenerator of claims 35 or 44, wherein the fuel system further comprises:

a fuel controller for controlling a fuel pump to provide the fuel at the selected fuel rate from a fuel supply.

49. The turbogenerator of claim 48, wherein controlling the fuel pump comprises:

controlling the fuel pump in accordance with any one or more of the fuel temperature, the fuel energy content characteristics, the fuel specific gravity, and the air-to-fuel ratio.

50. The turbogenerator of claim 35, wherein the fuel system further comprises:

a fuel controller for selecting the fuel from among a plurality of available fuels, each available fuel having known energy content characteristics.

51. The turbogenerator of claim 50, wherein the fuel system comprises:

a fuel controller for selecting the fuel from among a plurality of available gaseous and liquid fuels.

52. The turbogenerator of claim 35, wherein the turbine controller comprises:

a turbine controller for determining the rate of air mass flow based upon any one or more of a turbine compressor speed, ambient air temperature, and ambient air pressure.

53. The turbogenerator of claim 35, wherein the turbine controller comprises:

a turbine controller for measuring the rate of air mass flow.

54. The turbogenerator of claim 36, wherein the fuel system further comprises:

a fuel controller for selectively supplying air and fuel through one or more of the plurality of nozzles in a selected one of a plurality of respective pre-mix nozzle operating modes, and further for selectively supplying only fuel through one or more of the plurality of nozzles in a selected one of a plurality of respective pilot nozzle operating modes.

55. The turbogenerator of claim 54, wherein the fuel system further comprises:

a fuel controller for transitioning from a first nozzle operating mode to a second nozzle operating mode.

56. The turbogenerator of claim 55, wherein the fuel system comprises:

a fuel controller for transitioning from a first nozzle operating mode to a second nozzle operating mode in response to a change in the value selected for the turbine operating parameter.

57. The turbogenerator of claim 56, wherein the turbine operating parameter is any one of turbine load, turbine speed, or turbine exhaust temperature.

58. The turbogenerator of claims 56 or 57, wherein the fuel system comprises:

a fuel controller for transitioning from a first nozzle operating mode to a second nozzle operating mode in accordance with the value of the change in the turbine operating parameter selected value.

59. The turbogenerator of claim 58, wherein the fuel system comprises:

a fuel controller for selecting the second operating mode in accordance with the fuel energy content characteristics.

60. The turbogenerator of claim 59, wherein the fuel system comprises:

a fuel controller for transitioning from a first nozzle operating mode to a second nozzle operating mode over a predetermined period of time selected in accordance with the fuel energy content characteristics.

61. The turbogenerator of claim 60, wherein the fuel system comprises:

a fuel controller for energizing an igniter in the combustor while transitioning from the first nozzle operating mode to the second nozzle operating mode.

62. The turbogenerator of claim 60, wherein the fuel system comprises:

a fuel controller for increasing the fuel rate while transitioning from the first nozzle operating mode to the second nozzle operating mode.

63. The turbogenerator of claim 61, wherein the fuel system comprises:

a fuel controller for increasing the fuel rate while transitioning from the first nozzle operating mode to the second nozzle operating mode.

64. The turbogenerator of claim 62, wherein the fuel system comprises:

a fuel controller for energizing an igniter in the combustor while transitioning from the first nozzle operating mode to the second nozzle operating mode.

65. The turbogenerator of claim 60, wherein the turbine operating parameter is the turbine exhaust temperature, and the fuel system comprises:

a fuel controller for increasing the selected turbine exhaust temperature value while transitioning from the first nozzle operating mode to the second nozzle operating mode.

66. The turbogenerator of claim 65, wherein the fuel system comprises:

a fuel controller for increasing the fuel rate while transitioning from the first nozzle operating mode to the second nozzle operating mode.

67. The turbogenerator of claim 66, wherein the fuel system comprises:

a fuel controller for energizing an igniter in the combustor while transitioning from the first nozzle operating mode to the second nozzle operating mode.

68. The turbogenerator of claim 54, wherein the fuel system comprises:

a fuel controller for operating in a pilot nozzle operating mode by sequentially energizing the fuel injection nozzles to promote swirling in the combustor.

* * * * *